UNITED STATES PATENT OFFICE.

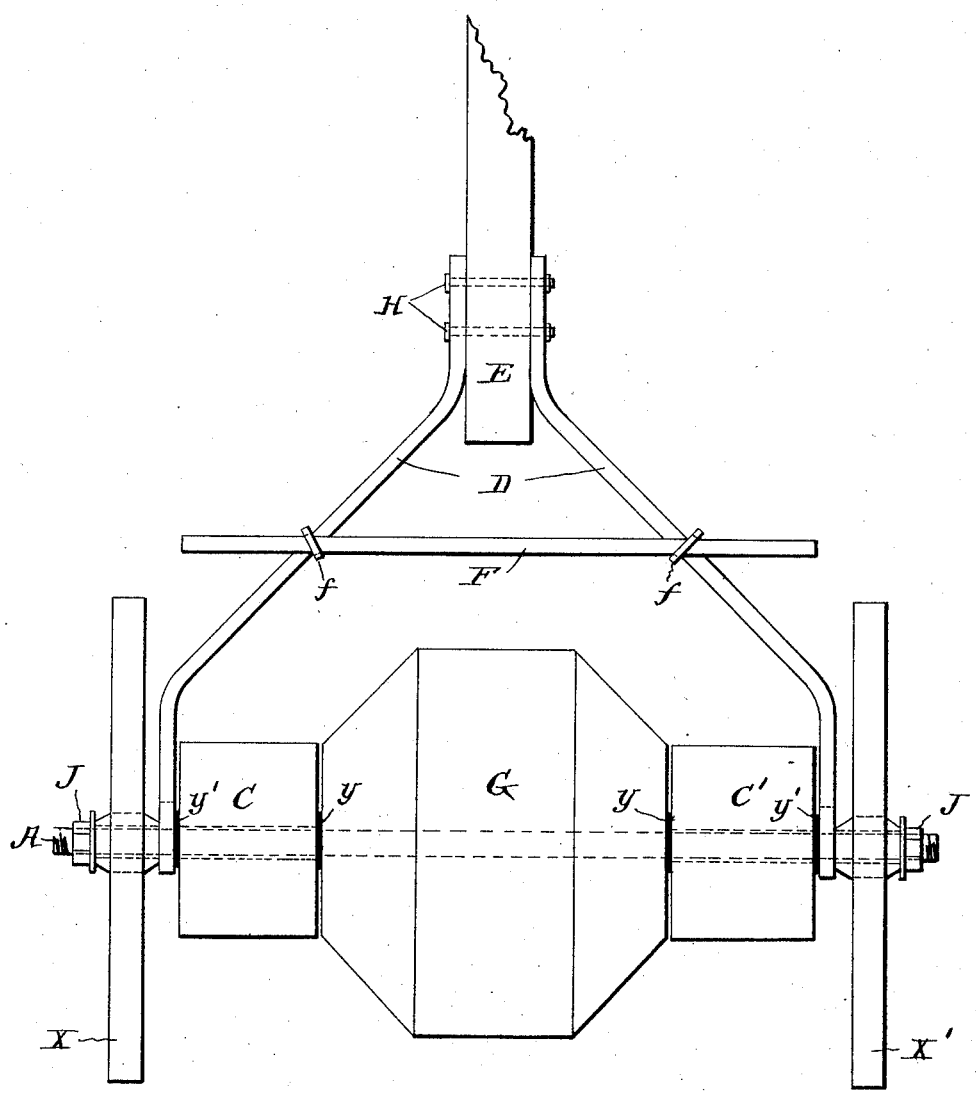

AUGUST SLOMSKI, OF HOGGE, KANSAS.

LISTED-FURROW PACKER.

1,040,041. Specification of Letters Patent. Patented Oct. 1, 1912.

Application filed August 31, 1911. Serial No. 647,122.

*To all whom it may concern:*

Be it known that I, AUGUST SLOMSKI, a citizen of the United States, and residing at Hogge, Leavenworth county, Kansas, have invented a Listed-Furrow Packer, of which the following is a specification.

My invention relates to improvements in listed furrow packers and my object is to provide an implement whereby the bottom, sides, and top of a furrow may be rolled for the purpose of crushing clods and packing the soil to retain moisture therein.

A further object is to provide means whereby the implement can be readily transported to and from a field.

The invention resides in the specific construction and arrangement of parts hereinafter described and pointed out in the claim, and in order that said invention may be fully understood, reference will now be made to the accompanying drawing, which shows a plan view of the implement embodying my invention.

In carrying out the invention, I employ a large roller G, which is substantially in the form of a double cone to fit the bottom and sides of a furrow. Said roller is preferably constructed of concrete, to give it sufficient weight to crush clods and pack the soil, and it is fixedly-mounted upon a centrally-disposed axle A, which extends therethrough and projects at opposite sides therefrom, as shown on the drawing.

Loosely-mounted upon the axle A at opposite sides of roller G, are small rollers C and C′ with flat peripheries to roll on the upper opposite sides of the furrow. These small rollers C and C′ are preferably made of the same material constituting the roller G and are spaced a slight distance from the latter by washers $y$ $y$, mounted upon the axle A to prevent the sides of the small rollers contacting with the adjacent sides of the large roller G. By thus mounting the small rollers C and C′ independently of the large roller G, the former are permitted to travel through a greater number of revolutions in a given space than the latter and consequently will not drag along over the surface of the soil, owing to the difference in diameter.

Loosely-mounted upon axle A, adjacent the outer side of each small roller and spaced therefrom by washers $y'$ $y'$ are two draft-bars D, which converge to a centrally-disposed tongue E, removably-secured thereto by bolts H. Said draft-bars D are reinforced by a transverse member F, secured thereto by clips $f$, and to which a pair of shafts (not shown) may be secured when it is desired to employ a single draft-animal for hauling the implement. The opposite ends of axle A project beyond the draft-bars D, as shown on the drawing, to receive a pair of wheels X and X′, for the purpose of readily carrying the implement to and from a field. The wheels X and X′ are removably-secured upon the axle A by nuts J J.

From the foregoing description, it will be understood that I have produced an implement adapted to pass over a list or furrow to closely pack the soil at the sides and top thereof and thoroughly crush all clods.

Having thus described my invention what I claim and desire to secure by Letters Patent, is:

An implement of the character described, consisting of a large double conical roller, an axle upon which said roller is fixedly-mounted, a small roller loosely-mounted upon the axle at each side of the conical roller, washers mounted on the axle and interposed between the large and small rollers, draft appliances mounted on the axle adjacent the small rollers, and a pair of wheels removably-mounted upon the axle, for the purpose set forth and described.

AUGUST SLOMSKI.

Witnesses:
A. B. TALMAGE,
HENRY POGGEMEYER.

Copies of this patent may be obtained for five cents each, by addressing the "Commissioner of Patents, Washington, D. C."